United States Patent
Kato

(10) Patent No.: US 10,389,291 B2
(45) Date of Patent: Aug. 20, 2019

(54) MOTOR DRIVE DEVICE AND MOTOR DEVICE METHOD FOR EPS SYSTEM

(71) Applicant: Hitachi Automotive Systems, Ltd., Hitachinaka-shi, Ibaraki (JP)

(72) Inventor: Yawara Kato, Isesaki (JP)

(73) Assignee: Hitachi Automotive Sytems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/855,075

(22) Filed: Sep. 15, 2015

(65) Prior Publication Data

US 2016/0087572 A1 Mar. 24, 2016

(30) Foreign Application Priority Data

Sep. 19, 2014 (JP) .................................. 2014-191519

(51) Int. Cl.
*H02P 27/06* (2006.01)
*H02P 29/02* (2016.01)
(Continued)

(52) U.S. Cl.
CPC ............ *H02P 27/06* (2013.01); *B60L 3/0023* (2013.01); *B60L 3/04* (2013.01); *B60L 15/20* (2013.01); *B60W 10/00* (2013.01); *H02P 6/10* (2013.01); *H02P 29/026* (2013.01); *H02P 29/0241* (2016.02); *B60L 2240/423* (2013.01); *B60L 2240/527* (2013.01); *B60L 2240/80* (2013.01);
(Continued)

(58) Field of Classification Search
USPC ........... 318/504, 139, 130, 817; 320/66, 132
See application file for complete search history.

(56) References Cited

U.S. PATENT DOCUMENTS 5,804,973 A * 9/1998 Shinohara ........... B60L 11/1807
324/537
6,051,945 A * 4/2000 Furukawa ............ H02H 7/0851
318/264

(Continued)

FOREIGN PATENT DOCUMENTS

JP 2003-170857 A 6/2003
JP 2004-122943 A 4/2004

(Continued)

OTHER PUBLICATIONS

Japanese-language Office Action issued in Japanese Application No. 2014-191519 dated Jan. 23, 2018, with English translation (seven (7) pages.

*Primary Examiner* — Jorge L Carrasquillo
(74) *Attorney, Agent, or Firm* — Crowell & Moring LLP

(57) ABSTRACT

A motor drive device includes an inverter that drives a motor, a power source smoothing capacitor of the inverter, and a control unit that controls the inverter to drive the motor. The control unit precharges the capacitor with a power source voltage, and calculates a capacity value of the capacitor, based on a ratio of the power source voltage and a voltage with which the capacitor is charged, or an amount of time taken until the voltage with which the capacitor is charged, after the passage of a predetermined amount of time from the start of the precharge, reaches a voltage corresponding to the power source voltage. The control unit performs torque limitation of the motor when the capacity value of the capacitor has decreased.

11 Claims, 5 Drawing Sheets

(51) Int. Cl.

| | | |
|---|---|---|
| *H02M 7/44* | (2006.01) | |
| *H02P 6/10* | (2006.01) | |
| *H02P 29/024* | (2016.01) | |
| *B60L 3/00* | (2019.01) | |
| *B60L 3/04* | (2006.01) | |
| *B60L 15/20* | (2006.01) | |
| *B60W 10/00* | (2006.01) | |

(52) U.S. Cl.
CPC .............. *H02M 7/44* (2013.01); *Y02T 10/644* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 6,148,950 A * | 11/2000 | Mukai ................. | B62D 5/0466 |
| | | | 180/446 |
| 6,392,854 B1 * | 5/2002 | O'Gorman .......... | B62D 5/0487 |
| | | | 180/443 |
| 2003/0106737 A1 * | 6/2003 | Itakura ................ | B62D 5/0484 |
| | | | 180/446 |
| 2009/0033294 A1 * | 2/2009 | Odajima .............. | B60L 11/005 |
| | | | 320/166 |
| 2012/0133314 A1 * | 5/2012 | Kozarekar ............ | B60L 1/003 |
| | | | 318/473 |
| 2015/0365019 A1 * | 12/2015 | Yamamoto ............. | H02P 1/022 |
| | | | 318/490 |

FOREIGN PATENT DOCUMENTS

| | | | |
|---|---|---|---|
| JP | 2006-161854 A | | 6/2006 |
| JP | 2006331323 A | * | 12/2006 |
| JP | 2007-252181 A | | 9/2007 |

\* cited by examiner

MOTOR DRIVE DEVICE AND MOTOR DEVICE METHOD FOR EPS SYSTEM

BACKGROUND OF THE INVENTION

1. Field of the Invention

The present invention relates to a motor drive device and a motor drive method for use in, for example, electric power steering (EPS) systems that assist in steering of a steering wheel with a motor.

2. Description of the Related Art

In recent years, interest in the functional safety of automobiles has been increasing, and safety when there is sudden loss of assisted control performed by an EPS has been discussed in the Japan Automotive Software Platform and Architecture (JASPAR), Europe, etc. As one of the factors in sudden-loss of assisted control, the influence of voltage fluctuation caused by a decrease in capacity of a power source smoothing capacitor of an inverter is considered. In EPS systems, the mainstream function of current fail-safe (F/S) is to discontinue assistance when there is detection of an abnormality by a current monitor (for example, refer to JP 2004-122943 A).

The decrease in capacity of the capacitor is caused by degradation over the passage of time, temperature changes, etc. When the capacity of the capacitor has decreased, since it is difficult to detect an abnormality by a current monitor in a state in which the amount of assistance is small, the abnormality is detected after the amount of assistance increases. If the assistance is discontinued (manual steering) during traveling of a vehicle in a state in which the amount of assistance is large, there is a concern that a driver may feel a sense of discomfort in steering or steering may suddenly become difficult.

Additionally, in EPS systems, in order to achieve a reduction in size, hybrid capacitors may be adopted instead of electrolytic capacitors. The hybrid capacitors have the advantage in that equivalent series resistance (ESR) is small, tolerance against a ripple current is large, and momentary current evaluation is possible even at low capacity. However, since the capacity is low, the influence of a decrease in capacity becomes greater, and the voltage of an amplifier unit of the inverter fluctuates greatly. As a result, there are problems in that the motor control deviates and steering vibration occurs.

SUMMARY OF THE INVENTION

Thus, an object of the invention is to provide a motor drive device and a motor drive method that can reduce sudden stop of a motor or deviation of motor control, and can improve safety.

According to an aspect of this invention, there is provided a motor drive device comprising: an inverter that drives a motor; a power source smoothing capacitor of the inverter; and a control unit that controls the inverter to drive the motor, the control unit precharges the capacitor with a power source voltage, calculates a capacity value of the capacitor, based on a ratio of the power source voltage and a voltage with which the capacitor is charged, after the passage of a predetermined amount of time from the start of precharge, or an amount of time taken until the voltage with which the capacitor is charged, reaches a voltage corresponding to the power source voltage, and performs torque limitation of the motor when the capacity value of the capacitor has decreased.

According to another aspect of this invention, there is provided a motor drive method for detecting a decrease in capacity of a power source smoothing capacitor of an inverter driving a motor, to perform torque limitation of the motor, the method comprising: precharging the capacitor with a power source voltage; calculating a capacity value of the capacitor, based on a ratio of the power source voltage and a voltage with which the capacitor is charged, after the passage of a predetermined amount of time from the start of precharge, or an amount of time taken until the voltage with which the capacitor is charged, reaches a voltage corresponding to the power source voltage; and performing the torque limitation of the motor when the capacity value of the capacitor has decreased.

Other objects and features of aspects of the present invention will be understood from the following description with reference to the accompanying drawings.

DESCRIPTION OF PREFERRED EMBODIMENTS

Figure 1:
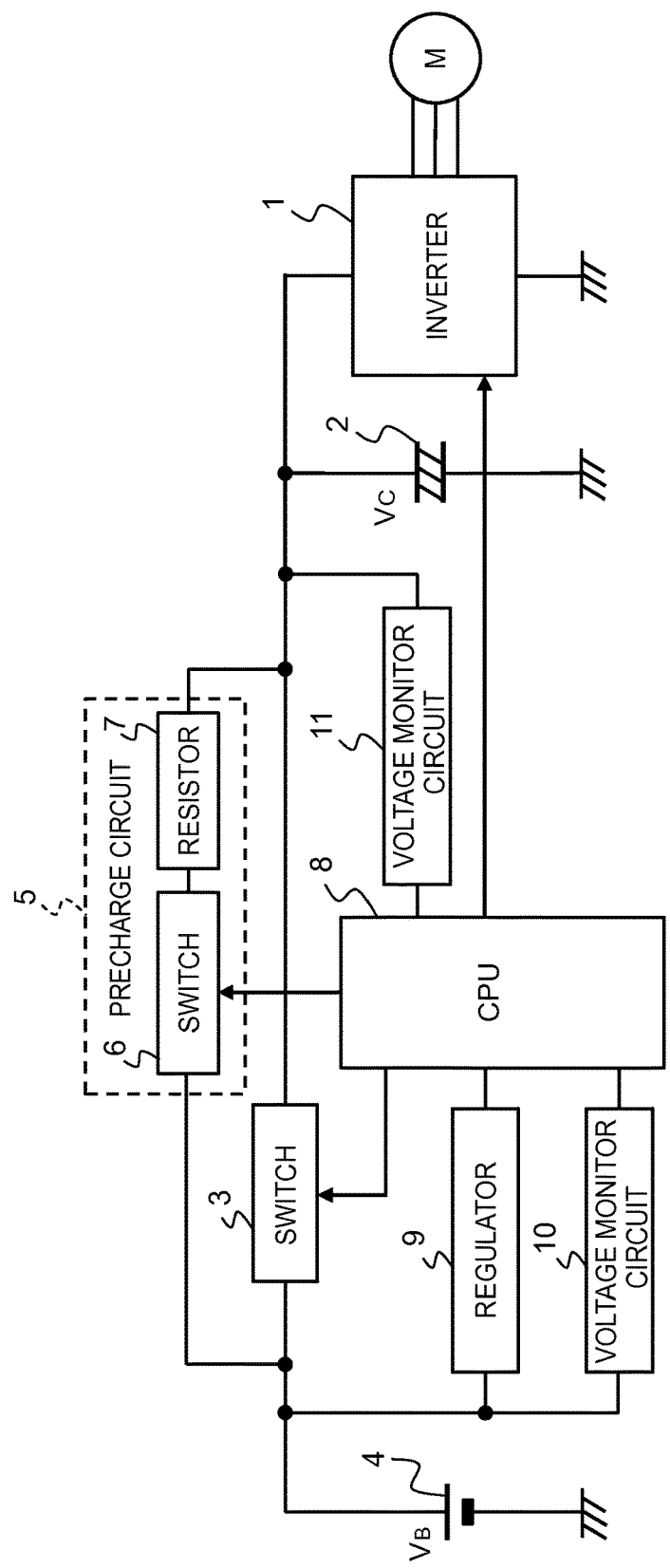
FIG. 1 is a circuit diagram illustrating a schematic configuration of a motor drive device according to an embodiment of the invention.

FIG. 1 illustrates a schematic configuration of a motor drive device according to an embodiment of the invention, and illustrates only an assisting motor M in an EPS system and a control unit of motor M herein. A positive electrode of a power source (DC power source) 4, such as a battery, is connected to an inverter 1 that performs three-phase driving of motor M via a first switch 3 for fail-safe (fail-safe relay).

A power-source smoothing capacitor 2 is connected between a power source terminal of inverter 1 and a grounding point, and is electrically separated from power source 4 by first switch 3. A precharge circuit 5 is connected between the positive electrode of power source 4 and one electrode of capacitor 2. Precharge circuit 5 includes a second switch 6 for precharge, and a load resistor 7 connected in series to the second switch 6, and precharge circuit 5 precharges capacitor 2 via resistor 7 from power source 4 when switch 6 is turned on.

A power is supplied from power source 4 via a regulator 9 to a central processing unit (CPU) 8, which is a main control unit. A power source voltage $V_B$ and a terminal voltage $V_C$ of capacitor 2, which are measured with voltage monitor circuits 10 and 11, are input to CPU 8. Then, CPU 8 monitors the voltages $V_B$ and $V_C$, and controls first and second switches 3 and 6, and inverter 1, to drive motor M.

Figure 2:
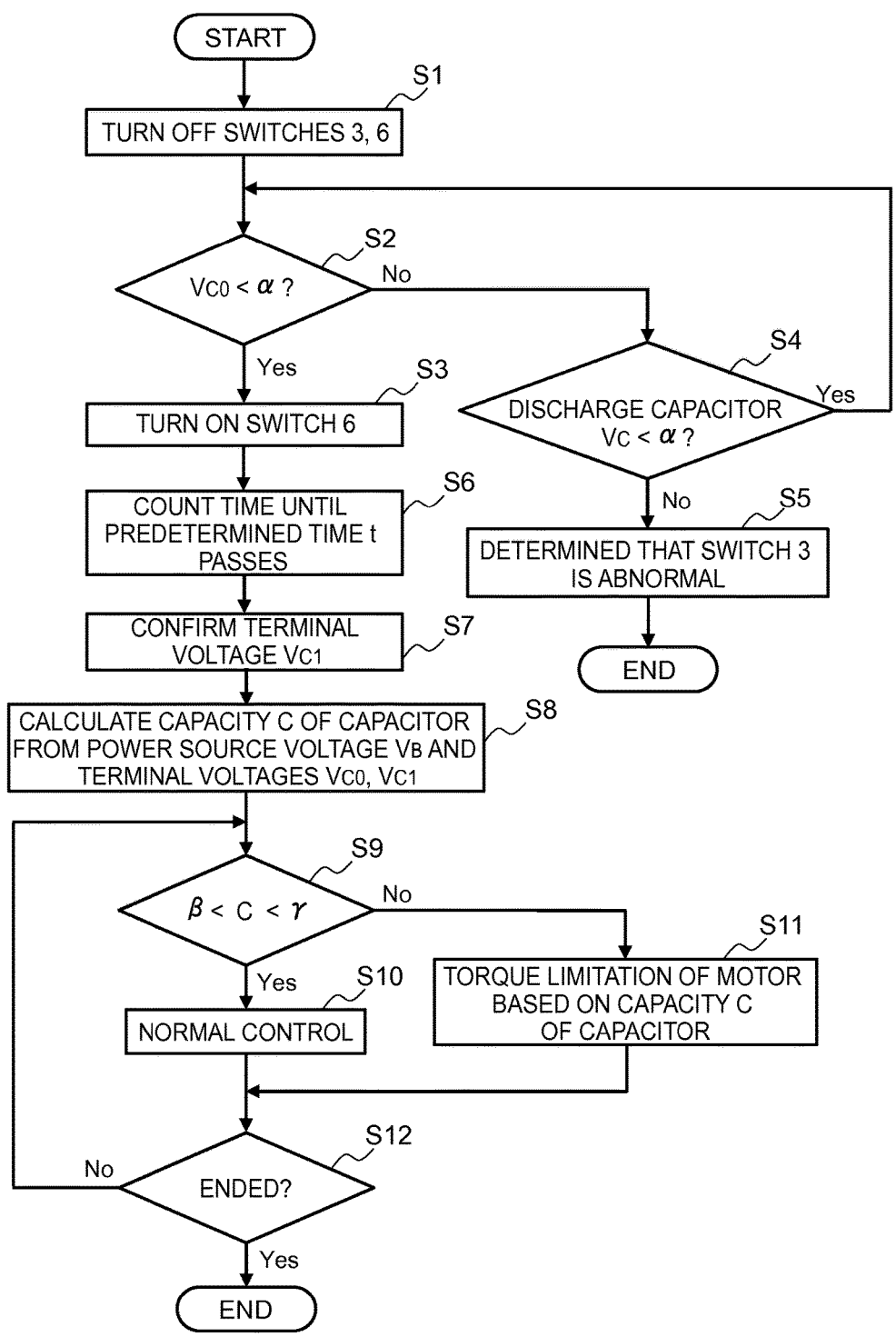
FIG. 2 is a flowchart illustrating the operation of the circuit illustrated in FIG. 1.

In such a configuration, initial diagnosis (initial check) for detecting whether or not the capacity value of capacitor 2 has decreased is performed prior to the normal control of motor M, as illustrated in a flowchart of FIG. 2. In the initial diagnosis, first switch 3 for fail-safe and second switch 6 for precharge are first made to be in an OFF state (Step S1). In this state, voltage monitor circuit 11 measures a terminal voltage $V_{C0}$ of capacitor 2, and determines whether this terminal value is less than a predetermined voltage value α (Step S2). If the terminal voltage $V_{C0}$ is less than the voltage value α, second switch 6 is turned on (Step S3).

On the other hand, when it is determined in Step S2 that the voltage $V_{C0}$ is greater than or equal to the predetermined voltage value α, capacitor 2 is discharged, and it is determined whether or not the terminal voltage $V_C$ of capacitor 2 after the discharge is less than the predetermined voltage value α (Step S4). Then, if it is determined that the terminal voltage Vc is less than the predetermined voltage value α, the processing returns to Step S2, whereas if it is determined that the terminal voltage $V_c$ is greater than or equal to the predetermined voltage value α, it is determined that switch 3 is abnormal (Step S5).

When second switch 6 is turned on in Step S3, capacitor 2 is charged with the power source voltage $V_B$ by precharge circuit 5, and the monitored voltage of voltage monitor circuit 11 increases. After second switch 6 is turned on, an amount of time taken until a predetermined time t passes is counted (Step S6), and a terminal voltage $V_{C1}$ of capacitor 2 at this time is measured and confirmed by the voltage monitor circuit 11 (Step S7). Subsequently, capacity C of capacitor 2 is calculated from the power source voltage $V_B$, the terminal voltage $V_{C0}$, and the terminal voltage $V_{C1}$ (Step S8). Then, it is determined whether or not the calculated capacity C of capacitor 2 is within a range of predetermined values β and γ (β<C<γ) (Step S9), and if the capacity C is within the range, normal control starts (Step S10).

When it is determined in Step S9 that the calculated capacity C is not within the range of the predetermined values β and γ, torque limitation of the motor is performed based on this capacity C (Step S11). A value for this limitation varies depending on systems to which this motor drive device is applied, and the limiting value may be made variable.

Thereafter, whether or not the motor driving is ended is determined, for example, depending on whether or not an ignition switch is turned off (Step S12), and the operation from Step S9 to Step S11 is repeated until the end of motor driving is determined.

Figure 3:
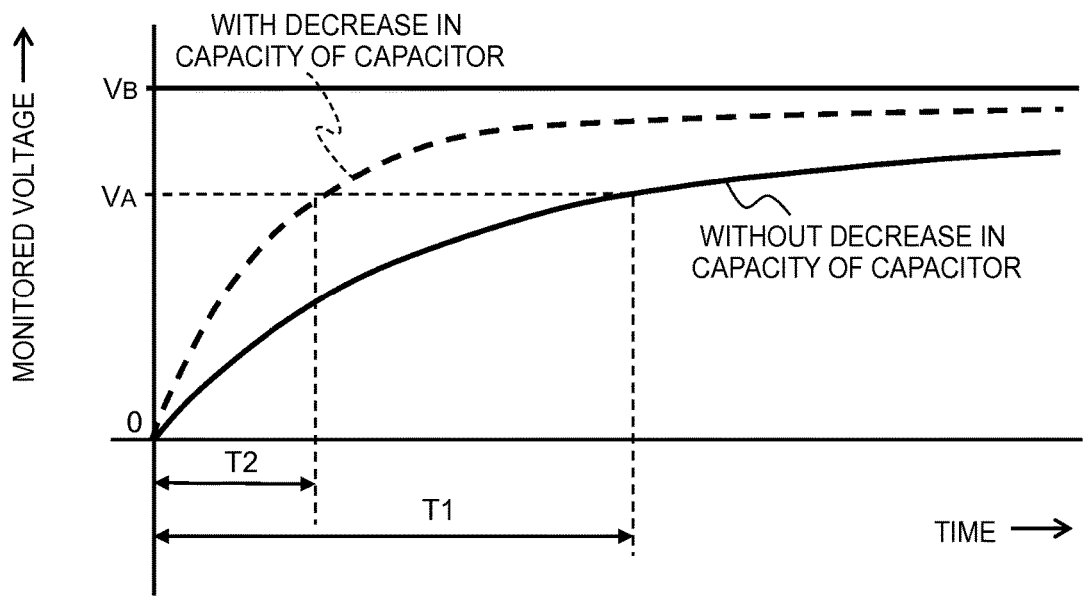
FIG. 3 is a characteristic diagram comparing and illustrating the relationship between precharge time and monitored voltage when the capacity of a capacitor has decreased and when the capacity of the capacitor has not decreased, in the circuit illustrated in FIG. 1.

FIG. 3 compares and illustrates the relationship between precharge time and the monitored voltage when the capacity of capacitor 2 has decreased and when the capacity of the capacitor has not decreased, in the motor drive device illustrated in FIG. 1. The power source voltage $V_B$ measured by the voltage monitor circuit 10 becomes a substantially constant value. In contrast, the rate of change of terminal voltage of capacitor 2 measured by voltage monitor circuit 11 varies depending on the capacity of capacitor 2. The amount of time until the terminal voltage reaches the predetermined voltage $V_A$ after the precharge is started by precharge circuit 5 decreases as the capacity of capacitor 2 decreases.

That is, when there is no decrease in capacity of capacitor 2, time T1 is required until the terminal voltage reaches the voltage $V_A$ as illustrated by a solid line, and when the capacity decreases, the time required until the terminal voltage reaches the voltage $V_A$ decreases to time T2 as illustrated by a dashed line. Then, as can be understood if the solid line and the dashed line are compared with each other, after the precharge starts, a difference between the voltages increases gradually, and then the difference starts to gradually decrease at a certain time point, and finally the voltages approach the power source voltage $V_B$. Therefore, the capacity value of capacitor 2 can be calculated by measuring the time T1, T2 taken until the terminal voltage reaches the predetermined voltage $V_A$.

The detection of the decrease in capacity of the capacitor 2 is performed by calculating the proportion (time constant) of a supply voltage (power source voltage $V_B$) and a voltage supplied to inverter 1 with respect to the time for charging capacitor 2 by precharge circuit 5 when the fail-safe relay (switch) 3 is turned off. Then, the capacity C of capacitor 2 is estimated from the time constant of the charging.

In other words, power-source smoothing capacitor 2 of inverter 1 is precharged, and the capacity value C of capacitor 2 is calculated based on a ratio of the power source voltage $V_B$ and a voltage "$V_{C1}$-$V_{C0}$" with which capacitor 2 is charged, after the passage of the predetermined time t, or an amount of time taken until the charging voltage "$V_{C1}$-$V_{C0}$" of capacitor 2 reaches a voltage corresponding to the power source voltage $V_B$. Then, when it is detected that the capacity value C of capacitor 2 has decreased, the torque limitation of motor M is performed.

Figure 4:
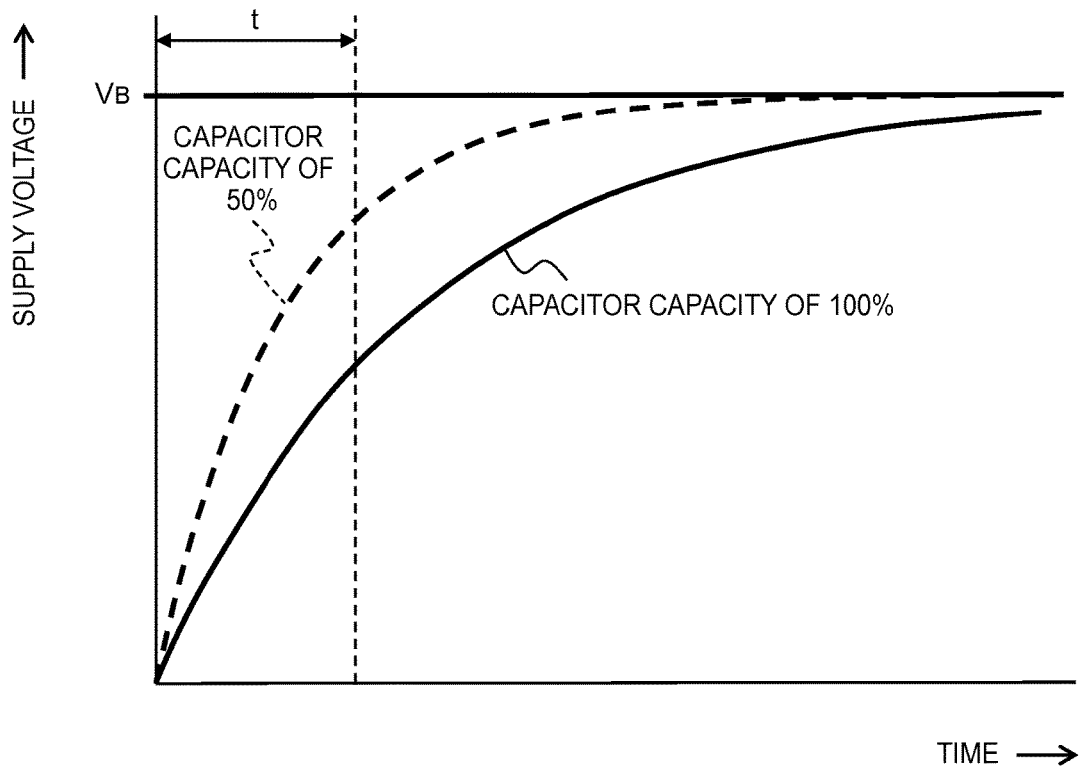
FIG. 4 is a characteristic diagram illustrating the relationship between the precharge time and precharge supply voltage caused by a difference in capacity of the capacitor, in the circuit illustrated in FIG. 1.
Figure 5:
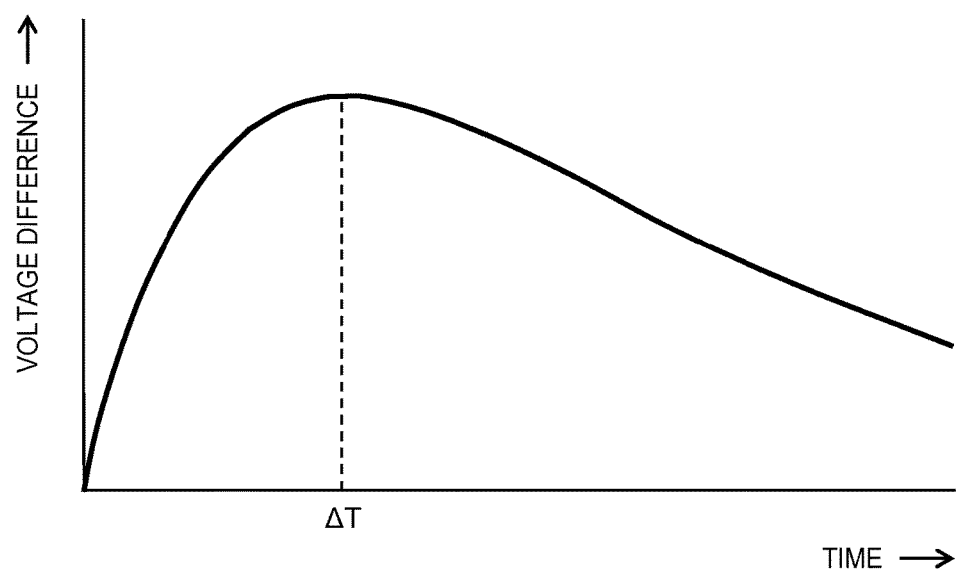
FIG. 5 is a characteristic diagram illustrating the relationship between precharge time and voltage differences in the terminal voltage of capacitor when the capacity of the capacitor has decreased and when the capacity of the capacitor has not decreased, in the circuit illustrated in FIG. 1.

Next, the calculation of the capacity value of capacitor 2 will be described in detail with reference to FIGS. 4 and 5. As illustrated in FIG. 4, changes in precharge voltage when the capacity of the capacitor has decreased from 100% to 50%, that is, becomes ½, can be calculated by Expressions (1) and (2), described below.

Here, if the capacity of the capacitor is the same, changes in capacity of the capacitor are calculated using the fact that voltage proportions (ratio) after a specified time do not change even if the precharge supply voltage (power source voltage $V_B$) changes.

In the following Expressions (1) and (2), VC100 corresponds to a case in which there is no decrease in capacity of the capacitor (100%), VC50 corresponds to a case in which the capacity of the capacitor has decreased to 50%, $V_B$ is the battery voltage, R is the resistance value of resistor 7, C is the capacity of capacitor 2, and t is the precharge time.

$$VC100 = V_B \times \left(1 - e^{-\frac{1}{RC}t}\right) \quad (1)$$

$$VC50 = V_B \times \left(1 - e^{-\frac{2}{RC}t}\right) \quad (2)$$

In addition, "2" that is the numerator of "2/RC" in the Expression (2) corresponds to a case in which the capacity becomes ½, and when the capacity becomes 1/a, for example, depending on the capacity of the capacitor to be detected, the numerator 2 is changed to "a".

If the capacity of the capacitor is assumed to have decreased to 50%, as indicated in the following Expressions (3), an optimum timing at which detectability becomes the highest can be calculated by subtracting the above (1) from the above (2). As illustrated in FIG. 5, the detectability becomes high when detection is performed at a timing ΔT at which a difference between the terminal voltages of capacitor 2 becomes the maximum.

$$VC50 - VC100 = V_B \times \left(1 - e^{-\frac{2}{RC}t}\right) - V_B \times \left(1 - e^{-\frac{1}{RC}t}\right) \quad (3)$$
$$= V_B \times \left\{\left(1 - e^{-\frac{2}{RC}t}\right) - \left(1 - e^{-\frac{1}{RC}t}\right)\right\}$$
$$= V_B \times \left(e^{-\frac{1}{RC}t} - e^{-\frac{2}{RC}t}\right)$$
$$= V_B \times \left(e^{-\frac{1}{RC}t} - e^{-\frac{2}{RC}t}\right)$$

Figure 6:
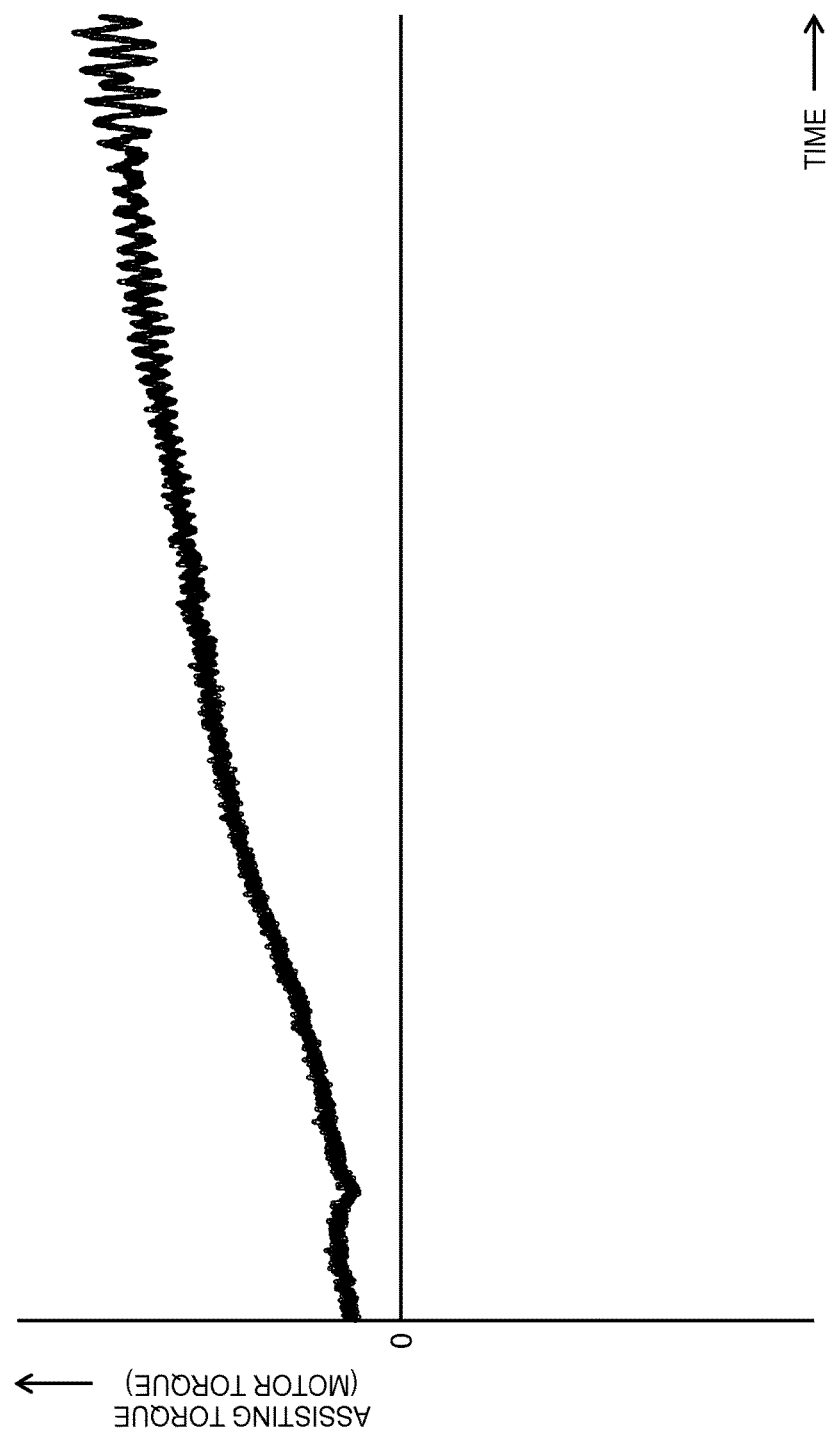
FIG. 6 is a waveform chart illustrating the relationship between assisting torque and torque fluctuation amount when the motor drive device according to the embodiment of the invention is applied to an EPS system.

FIG. 6 illustrates the relationship between assisting torque (motor torque) and torque fluctuation amount when the motor drive device according to the embodiment of the invention is applied to the EPS system. If a ripple (torque fluctuation amount) increases gradually with an increase in assisting torque, and if the assisting torque reaches a predetermined value (conventionally, the assistance is discontinued at this time), motor control deviates, and steering vibration occurs. Thus, in the present embodiment, the occurrence of discontinuing of assistance can be reduced by performing the torque limitation before the assisting torque reaches the predetermined value. In this case, the assistance can be weakened and continued by performing the assistance at a level lower than a level at which the assistance is discontinued in the conventional technique, while reducing the assisting torque so as not to exceed the above predetermined value, rather than simply discontinuing the assistance as in the conventional technique.

As described above, in the invention, the decrease in capacity of the capacitor is detected through the initial diagnosis before the start of the assistance, rather than during the assistance (during traveling), in order to avoid manual steering (discontinuing of assistance) during traveling. Additionally, when precharge is performed, a voltage value after a specified time, or an amount of time taken until a rise to a specified voltage is made, is measured, and the capacity value of the capacitor is calculated based thereon. Moreover, the changes in capacity of the capacitor are determined by monitoring a precharge-supply voltage (inverter unit voltage) and a capacitor voltage and calculating the time constant (ratio) based on the relationship with the capacity value of the capacitor.

Accordingly, a decrease in capacity of power-source smoothing capacitor 2 can be detected before motor controllability decreases. Moreover, when the capacity value of capacitor 2 has decreased, the torque limitation of assisting motor M is performed before the assistance using motor M is discontinued, rather than simply discontinuing the assistance, so that the deviation of the motor control can be reduced and the safety can be improved.

In addition, in the above-described embodiment, the case of the drive device of the assisting motor in the EPS system has been described as an example. However, of course the invention can be applied to general motor drive devices with a concern that trouble may occur in safety due to sudden stop of a motor.

Additionally, the circuit configuration of the motor drive device is not limited to the circuit illustrated in FIG. 1, and can be modified and performed in various ways without deviating from the scope of the invention.

Moreover, although the case in which detection is performed at a timing ΔT at which the difference between the terminal voltages of capacitor 2 becomes the maximum has been described as an example, the detection can be sufficiently performed even at a timing at which the difference has slightly deviated from the maximum value.

The entire contents of Japanese Patent Application No. 2014-191519 filed on Sep. 19, 2014, on which priority is claimed, are incorporated herein by reference.

While only a select embodiment has been chosen to illustrate and describe the present invention, it will be apparent to one skilled in the art from this disclosure that various changes and modifications can be made herein without deviating from the scope of the invention as defined in the appended claims.

Furthermore, the foregoing description of the embodiment according to the present invention is provided for illustration purposes only, and it is not for the purpose of limiting the invention, the invention being as claimed in the appended claims and their equivalents.

What is claimed is:

1. A method for detecting changes in capacitance, the method comprising:
    a first step of turning off a first switch for fail-safe and a second switch for precharge;
    a second step of measuring a terminal voltage of a capacitor with a voltage monitor circuit;
    a third step of turning on the second switch if the terminal voltage is less than the predetermined voltage value;
    a fourth step of discharging the capacitor if it is determined in the second step that the terminal voltage is greater than or equal to the predetermined voltage value;
    a fifth step of returning to the second step if it is determined that the terminal voltage is less than the predetermined voltage value;
    a sixth step of determining an amount of time taken until a predetermined time passes after the second switch is turned on;
    a seventh step of measuring and confirming the terminal voltage of the capacitor after the sixth step using the voltage monitor circuit;
    an eighth step of calculating a capacitance of the capacitor from the power source voltage and the terminal voltages;
    a ninth step of determining whether or not the capacitance of the capacitor is within a range of predetermined values;
    a tenth step of initiating a control routine if the capacitance is within the range of predetermined values;
    an eleventh step of limiting a torque of a motor based on the measured capacitance, if it is determined in the ninth step that the calculated capacitance is not within the range of predetermined values; and
    a twelfth step of determining whether or not a driving of the motor has ended.

2. The method according to claim 1, wherein in the second step the voltage monitor circuit determines whether the terminal voltage is less than a predetermined voltage value.

3. The method according to claim 2, wherein in the fourth step it is also determined whether or not the terminal voltage of capacitor, after the discharge, is less than the predetermined voltage value.

4. The method according to claim 3, wherein in the fifth step if it is determined that the terminal voltage is greater than or equal to the predetermined voltage value, the first switch is labeled as abnormal.

5. The method according to claim 4, wherein when the second switch is turned on in the third step, the capacitor is charged with a power source voltage by a precharge circuit, and the monitored voltage of voltage monitor circuit increases.

6. The method according to claim 5, wherein in the eleventh step a value for the limiting of the torque varies depending on systems to which the motor is applied, and the value is variable.

7. The method according to claim 6, wherein the determining in the twelfth step is based on whether or not an ignition switch is turned off, and wherein the ninth through eleventh steps are repeated until the driving of the motor has ended.

8. A motor drive device comprising:

an inverter that drives a motor;

a capacitor of the inverter; and a control unit that controls the inverter to drive the motor, wherein the control unit is configured to:

turn off a first switch for fail-safe and a second switch for precharge, measure a terminal voltage of the capacitor with a voltage monitor circuit, turn on the second switch if the terminal voltage is less than the predetermined voltage value, discharge the capacitor if it is determined that the terminal voltage is greater than or equal to the predetermined voltage value, again measure the terminal voltage of the capacitor if it is determined that the terminal voltage is less than the predetermined voltage value, determine an amount of time taken until a predetermined time passes after the second switch is turned on, measure and confirm the terminal voltage of the capacitor using the voltage monitor circuit, calculate a capacitance of the capacitor from the power source voltage and the terminal voltages, determine whether or not the capacitance of the capacitor is within a range of predetermined values, initiate a control routine if the capacitance is within the range of predetermined values, limit a torque of the motor based on the measured capacitance, if it is determined that the calculated capacitance is not within the range of predetermined values, and determine whether or not a driving of the motor has ended.

9. The motor drive device according to claim 8, wherein the voltage monitor circuit determines whether the terminal voltage is less than a predetermined voltage value, and wherein the control unit is also configured to determine whether or not the terminal voltage of the capacitor, after the discharge, is less than the predetermined voltage value.

10. The motor drive device according to claim 9, wherein if it is determined that the terminal voltage is greater than or equal to the predetermined voltage value, the control unit is also configured to label the first switch as abnormal, and when the second switch is turned on, the capacitor is charged with a power source voltage by a precharge circuit, and the monitored voltage of voltage monitor circuit increases.

11. The motor drive device according to claim 10, wherein a value for the limiting of the torque varies depending on systems to which the motor is applied, and the value is variable, and wherein the control unit is configured to determine whether or not a driving of the motor has ended based on whether or not an ignition switch is turned off.

* * * * *